United States Patent
Lee et al.

(10) Patent No.: US 8,249,194 B2
(45) Date of Patent: Aug. 21, 2012

(54) APPARATUS AND METHOD FOR CANCELING DIRECT CURRENT (DC) OFFSET IN BROADBAND WIRELESS ACCESS COMMUNICATION SYSTEM

(75) Inventors: Dong-Woo Lee, Suwon-si (KR); Yong-Won Shin, Suwon-si (KR); Hee-Chan Choi, Suwon-si (KR)

(73) Assignee: Samsung Electronics Co., Ltd, Samsung-ro, Yeongtong-gu, Suwon-si, Gyeonggi-do (KR)

( * ) Notice: Subject to any disclaimer, the term of this patent is extended or adjusted under 35 U.S.C. 154(b) by 943 days.

(21) Appl. No.: 12/275,308

(22) Filed: Nov. 21, 2008

(65) Prior Publication Data

US 2009/0129494 A1 May 21, 2009

(30) Foreign Application Priority Data

Nov. 21, 2007 (KR) ........................ 10-2007-0119305

(51) Int. Cl.
*H03K 9/00* (2006.01)
(52) U.S. Cl. ...................................................... 375/316

(58) Field of Classification Search ................... 375/316
See application file for complete search history.

(56) References Cited

U.S. PATENT DOCUMENTS

| 5,946,607 | A  | * | 8/1999  | Shiino et al. ............... 455/234.1 |
| 6,560,448 | B1 | * | 5/2003  | Baldwin et al. ............ 455/234.1 |
| 6,654,593 | B1 | * | 11/2003 | Simmons et al. .......... 455/234.1 |
| 7,319,852 | B2 | * | 1/2008  | Schlegel et al. ............... 455/324 |
| 7,457,374 | B2 | * | 11/2008 | Beyer et al. .................. 375/319 |
| 2004/0081256 | A1 | * | 4/2004 | Shi et al. ...................... 375/317 |
| 2004/0082302 | A1 | * | 4/2004 | Shippee ..................... 455/127.1 |
| 2004/0202102 | A1 | * | 10/2004 | Kim et al. ..................... 370/208 |
| 2004/0227567 | A1 | * | 11/2004 | Llewellyn ......................... 330/9 |

* cited by examiner

*Primary Examiner* — Juan A Torres
(74) *Attorney, Agent, or Firm* — Cha & Reiter, LLC

(57) ABSTRACT

An apparatus and method for canceling a Direct Current (DC) offset in a Broadband Wireless Access (BWA) communication system are provided. The method includes canceling a DC offset by performing self-calibration in a modulator/demodulator (modem), attempting initial synchronization acquisition in the modem, and if the initial synchronization acquisition succeeds, canceling a DC offset by performing DC offset trace and cancellation.

8 Claims, 5 Drawing Sheets

APPARATUS AND METHOD FOR CANCELING DIRECT CURRENT (DC) OFFSET IN BROADBAND WIRELESS ACCESS COMMUNICATION SYSTEM

CLAIM OF PRIORITY

This application claims priority under 35 U.S.C. §119 to an application filed in the Korean Intellectual Property Office on Nov. 21, 2007 and assigned Serial No. 10-2007-0119305, the contents of which are incorporated herein by reference.

BACKGROUND OF THE INVENTION

1. Field of the Invention

The present invention relates generally to a Broadband Wireless Access (BWA) communication system. More particularly, the present invention relates to an apparatus and method for canceling a Direct Current (DC) offset in a receiver of an Orthogonal Frequency Division Multiplexing (OFDM) system that is mainly used in a BWA communication system.

2. Description of the Related Art

Orthogonal Frequency Division Multiplexing (OFDM) enables a faster transmission using a relatively less frequency band and known to be robust in a multiple path channel environment. As such, OFDM is more widely employed in recent communication systems such as wireless Local Area Network (LAN), Wideband Broadband (Wibro), etc.

A receiver of an OFDM communication system demodulates a signal received from an antenna, via a Radio Frequency (RF) end, and then restores the signal to an original state. A signal received from an antenna goes under a frequency down-conversion and a signal-magnitude amplification, so that a receiver can acquire a desired signal. To this end, several types of analog devices such as a mixer and an amplifier are used. These devices meet the standards to some degree, but input signals are distorted due to drawbacks in inter-device insulating properties and orthogonality. One of main distortion causes is a DC offset.

The DC offset is generated because an RF of an OFDM wireless communication system is self-mixed in an analog circuit or because differential baseband devices are mismatched. The DC offset may deteriorate reception performance in instances of mixing an unexpected signal at a baseband end and receiving the baseband signal at a receiver, that is, during the process of inputting a signal to an Analog-to-Digital Converter (ADC).

In modern receivers, a direct conversion method is mostly used. The direct conversion method is a method in which an RF end directly converts to a baseband frequency. As the receiver using the direct conversion method directly converts a received RF signal to a baseband signal without converting the RF signal to an Intermediate Frequency (IF) signal, a filter, a mixer, an amplifier, etc. used for converting to an IF signal can be omitted. However, because a received RF signal and a local oscillation signal have the same frequency, a DC offset may be generated more, thus there is a need for canceling the DC offset.

At present, there are several technologies for correcting a DC offset existing within a Radio Frequency Integrated Circuit (RFIC). However, in most technologies, an RFIC measures and corrects its own DC offset, thus a modulator/demodulator (modem) fails know exactly the magnitude of a DC offset of its substantially received signal. As a result, if there is a DC offset in a device within an RFIC, the DC offset may not be canceled or fails to be reduced. There is a technology for estimating and correcting a DC offset in real time during a predetermined period of time irrespective of synchronization. However, this method has a problem that it may cause a rather higher error in an OFDM system. To address this, there is also a method of canceling a DC offset using a preamble only after the synchronization. However, there is a problem that, if DC offset correction is performed only after the synchronization acquisition, it is difficult to acquire an initial synchronization when there is a high DC offset in a non-corrected signal.

If a receiver attempts to acquire an initial synchronization, gains of amplifiers within the receiver increase at a low signal level, hence even a DC offset increases. If there is a high DC offset in the input signal of a modem, there is a problem of synchronization acquisition being increased only at a strong electric field and being decreased at a weak electric field if it is intended to reduce a gain within an RFIC and reduce a magnitude of a DC offset. Further, there is a problem of causing a deterioration in the reception sensitivity of a receiver that can acquire an initial synchronization and a decrease of a dynamic range of a reception unit of a terminal.

FIG. 1 is a graph illustrating a conventional process of DC offset variation of an RFIC. As shown, upon power on, most RFICs perform the initialization and its own calibration. Because the self-calibration is implemented by the RFIC, a modem is unaware of the magnitude of a substantially received DC offset. As a result, if there is a DC offset in a device within the RFIC, the DC offset may not be canceled or fails to be reduced to a desired level.

Also, although calibration is performed (i.e., although synchronization is achieved), an RFIC performs reception/transmission (Rx/Tx) switching. Thus, if temperature changes as time goes by, it cannot be calibrated with an initial calibration value. Further, there is a problem in that, if a Mobile Station (MS) in a sleep state or idle state for a lengthy time powers on and attempts a synchronization acquisition, a proper synchronization acquisition cannot be achieved using an initial value.

SUMMARY OF THE INVENTION

An aspect of the present invention is to substantially solve at least the above problems and/or disadvantages and to provide at least the advantages below. Accordingly, one aspect of the present invention is to provide an apparatus and method for canceling a Direct Current (DC) offset in a Broadband Wireless Access (BWA) communication system.

Another aspect of the present invention is to provide an apparatus and method for, upon attempting initial synchronization acquisition and even after synchronization acquisition, effectively canceling a DC offset in a receiver of a Mobile Station (MS) used in a BWA communication system.

The above aspects are achieved by providing an apparatus and method for canceling a DC offset in a BWA communication system.

According to another aspect of the present invention, a method for canceling a Direct Current (DC) offset in a receiver of a Broadband Wireless Access (BWA) communication system includes canceling a DC offset by performing self-calibration in a modulator/demodulator (modem), attempting initial synchronization acquisition in the modem, and if the initial synchronization acquisition succeeds, canceling a DC offset by performing DC offset trace and cancellation.

According to another aspect of the present invention, an apparatus for canceling a Direct Current (DC) offset in a receiver of a Broadband Wireless Access (BWA) communication system includes a modulator/demodulator (modem).

The modem cancels a DC offset by performing its own calibration, attempts initial synchronization acquisition, and if the initial synchronization acquisition succeeds, cancels a DC offset by performing DC offset trace and cancellation.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE INVENTION

Now, embodiments of the present invention will be described herein below with reference to the accompanying drawings. For the purposes of clarity and simplicity, well-known functions or constructions are not described in detail as they would obscure the invention in unnecessary detail.

According to the teachings of the invention, a DC offset before synchronization acquisition is effectively cancelled as described herein below. Note that when there is a high DC offset in an input signal of a modulator/demodulator (modem), a possibility of synchronization acquisition at a weak electric field is reduced. This causes a deterioration of reception sensitivity of a receiver that can acquire initial synchronization and a decrease of a dynamic range of a receiving unit of a terminal.

According to an exemplary embodiment of the present invention, in a coarse frame synchronization step implemented just before synchronization acquisition, a fast Automatic Gain Controller (AGC) of a modem determines a gain index for synchronization acquisition, thus sets a gain for amplifiers of a receive end of a Radio Frequency Integrated Circuit (RFIC).

After that, the modem measures a DC offset with no signal input to the RFIC, determines if the DC offset value is more or less than a reference value and then, if it is determined to be more than the reference value, performs inverse calibration by the magnitude of difference between the measured DC offset value and the reference value. By doing so, the modem can guarantee an excellent performance of initial synchronization acquisition.

After synchronization acquisition, in a normal operation mode, the modem measures a magnitude of a DC offset value at each frame of a specific time, determines if the DC offset value is more or less than a reference value and then, if it is determined to be more than the reference value, stores the DC offset value in a DC offset correction end of the RFIC. Therefore, the modem can trace the DC offset by measuring and lets the DC offset correction end of the RFIC remove the DC offset by storing. That is, the modem can enhance reception performance of a receiver by increasing a Carrier to Interference Noise Ratio (CINR) of the receiver.

An exemplary embodiment of the present invention is comprised of a modem for measuring a DC offset and an RFIC for correcting the DC offset, as later shown in FIG. 5.

Figure 1:
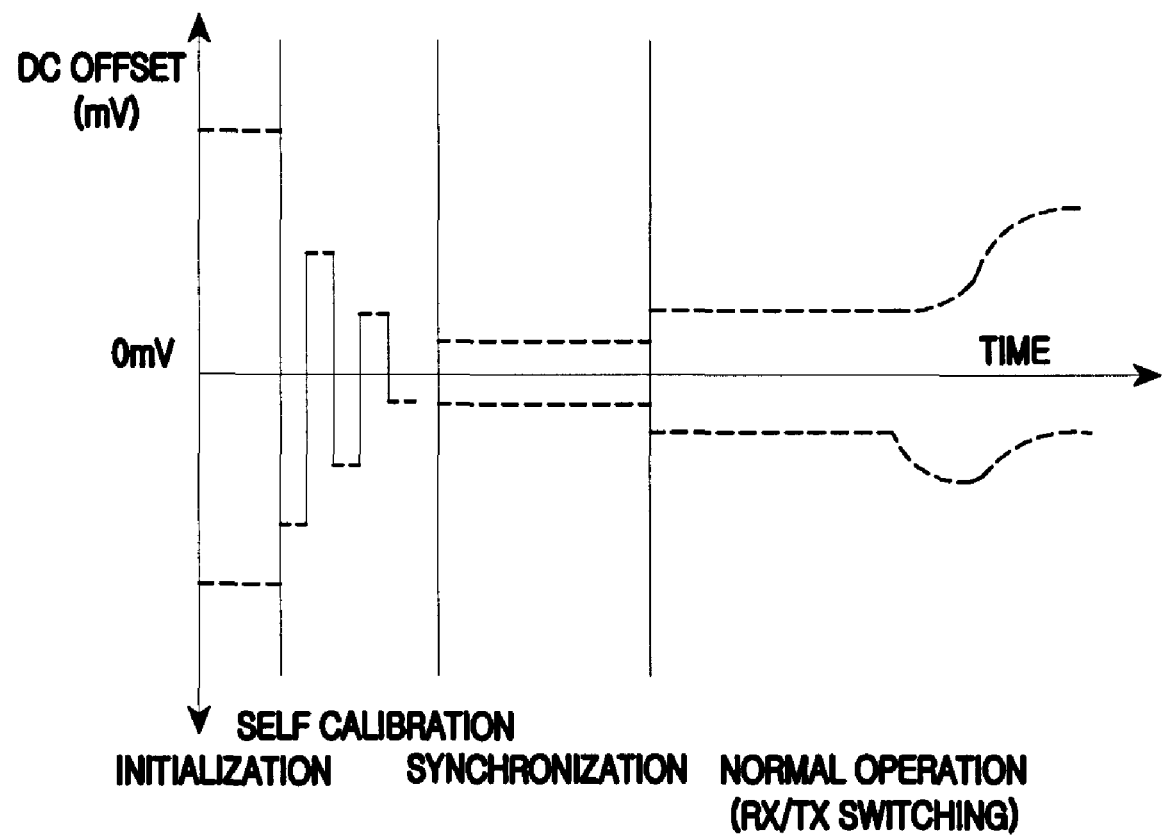
FIG. 1 is a graph illustrating a conventional process of DC offset variation of a Radio Frequency Integrated Circuit (RFIC)
Figure 2:
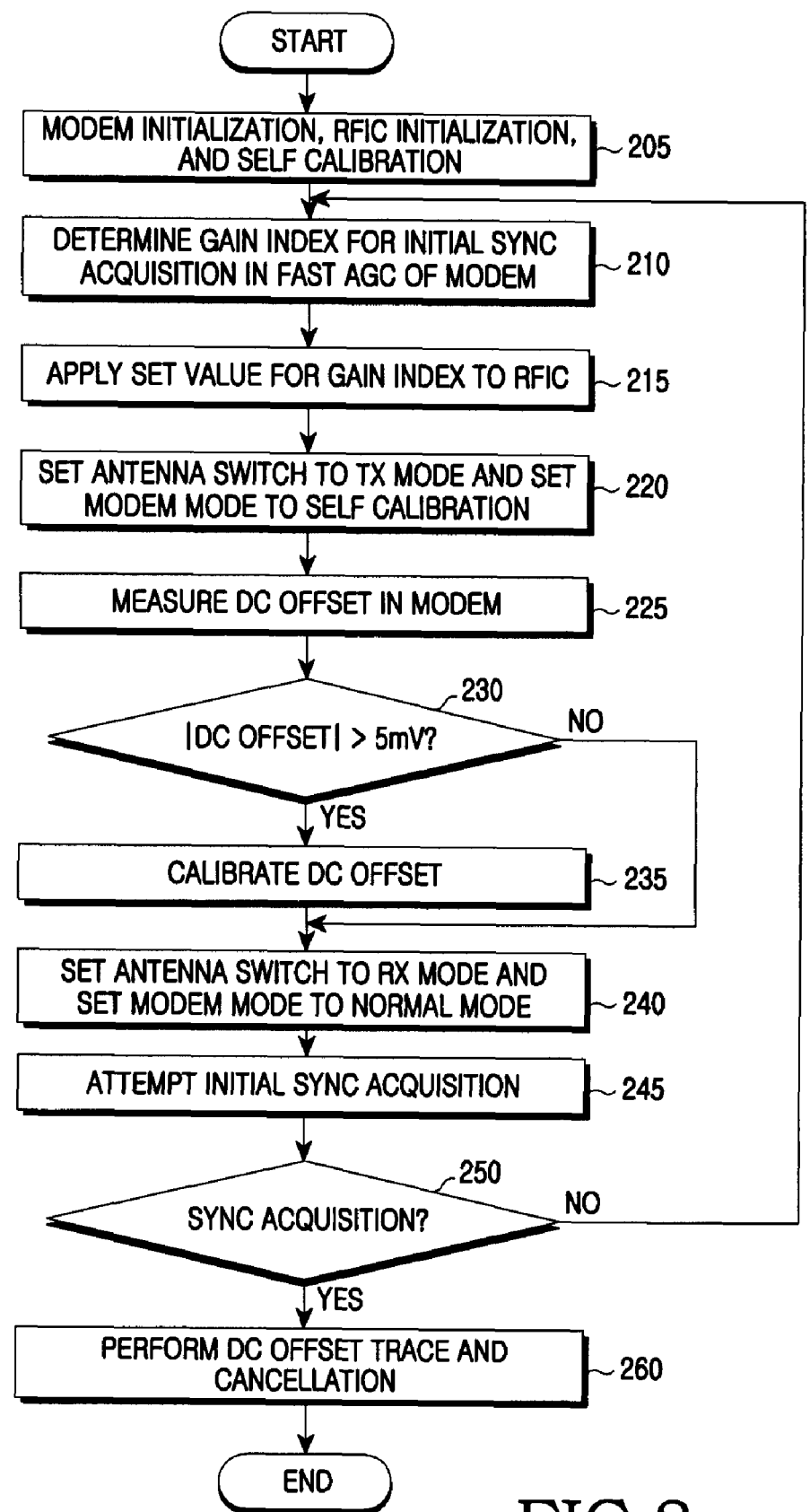
FIG. 2 is a flow diagram illustrating the process of canceling a DC offset according to an exemplary embodiment of the present invention.

FIG. 2 is a flow diagram illustrating the process of canceling a DC offset according to an exemplary embodiment of the present invention.

Referring to FIG. 2, in step 205, if a receiver powers on, a modem and RFIC perform an initialization process and, particularly, the RFIC performs a self calibration process.

In step 210, a fast AGC of the modem determines a gain index for initial synchronization acquisition. According to an exemplary embodiment of the present invention, the fast AGC decides a gain index for synchronization acquisition in a coarse frame synchronization step implemented just before synchronization acquisition and thus, sets gains of amplifiers of a receive end of an RFIC.

In step 215, the modem applies a set value for the determined gain index to the RFIC. Then, in step 220, the modem sets an antenna switch to a transmission (Tx) mode, that is, in the Tx mode, performs self calibration process In step 225, the modem measures a DC offset with no signal input to the RFIC in a self calibration mode. And, in step 230, determines if the DC offset value is more or less than a reference value (e.g., 5 mV). If it is determined to be more than the reference value in step 230, the modem performs inverse calibration by the magnitude of difference between the measured DC offset value and the reference value in step 235, thus enabling an excellent performance of initial synchronization acquisition. Then, in step 240, the modem sets the antenna switch to a reception (Rx) mode and transits to a normal mode. If it is determined to be less than the reference value in step 230, the modem jumps to step 240 and transits to the normal mode.

After that, in step 245, the modem attempts initial synchronization acquisition. If the initial synchronization acquisition fails in step 250, the modem resumes the gain index process of step 210 and its subsequent steps for initial synchronization acquisition.

Figure 3:
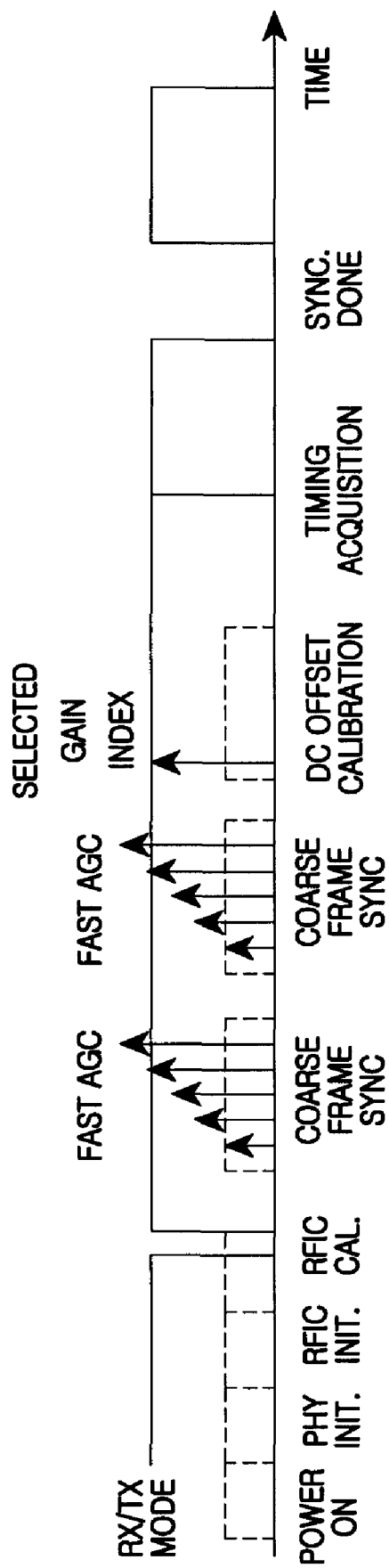
FIG. 3 is a schematic diagram illustrating the process of DC offset calibration according to an exemplary embodiment of the present invention.

If the initial synchronization acquisition succeeds in step 250, the modem performs a DC offset trace and cancellation process in step 260. The DC offset trace and cancellation process is described in FIG. 4. As shown, FIG. 3 is a schematic diagram illustrating the process of DC offset calibration according to an exemplary embodiment of the present invention In FIG. 3, after a modem and RFIC are initialized, a fast AGC determines a gain index for initial synchronization acquisition. The modem performs a self calibration process and then, performs a DC offset calibration process.

Figure 4:
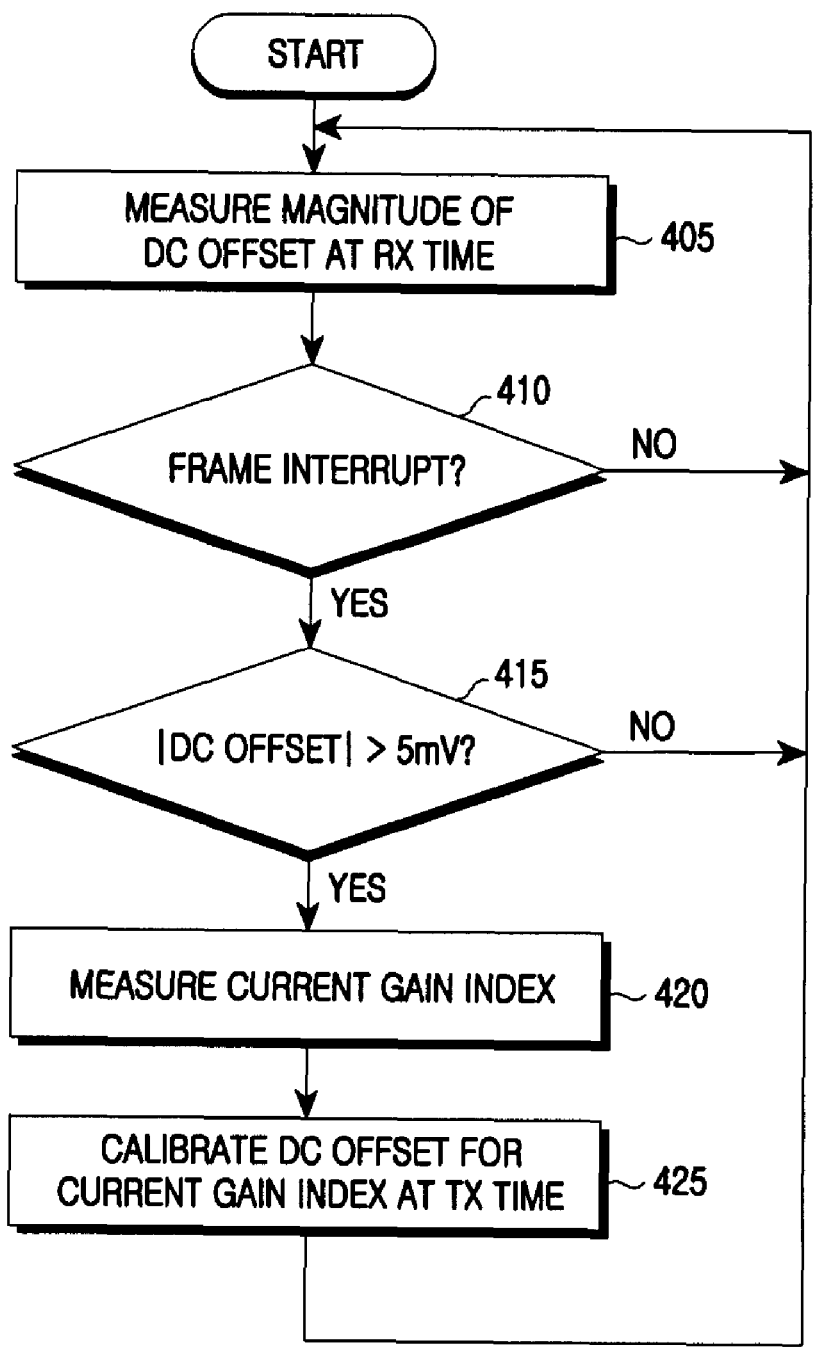
FIG. 4 is a flow diagram illustrating the process of tracing and canceling a DC offset according to an exemplary embodiment of the present invention.

FIG. 4 is a flow diagram illustrating the process of tracing and canceling a DC offset according to an exemplary embodiment of the present invention.

Referring to FIG. 4, in step 405, a modem initiates measuring a magnitude of a DC offset value. After that, if a frame interrupt occurs at the time of frame reception in step 410, the modem determines if the measured DC offset value is more or less than a reference value (e.g., 5 mV) in step 415. If it is determined to be more than the reference value in step 415, the modem measures a current gain index value in step 420.

Then, in step 425, the modem traces and cancels a DC offset by storing a calibration value in a DC offset correction end of an RFIC depending on the gain index value during a transmission time. If it is aware of the gain index value, the modem can be aware of how to control a DC offset and the gain index is identical to the gain index in step 210 in FIG. 2 and the fast AGC of the modem determines the gain index for initial synchronization acquisition. The modem lets the DC offset correction end of an RFIC perform inverse calibration by the magnitude of difference between the measured DC offset value and the reference value. In this step, the modem may adjust the magnitude of difference to achieve the gain index or the modem just lets the DC offset correction end of an RFIC perform inverse calibration by the magnitude of difference between the measured DC offset value and the reference value without adjusting.

Thus, the modem can enhance the reception performance of a receiver by increasing a Carrier to Interference Noise Ratio (CINR) of the receiver. The loop from step 405 to step 415 may be called as 'the DC offset trace process' and the step of 425 may be call as 'the DC offset cancellation process'.

Figure 5:
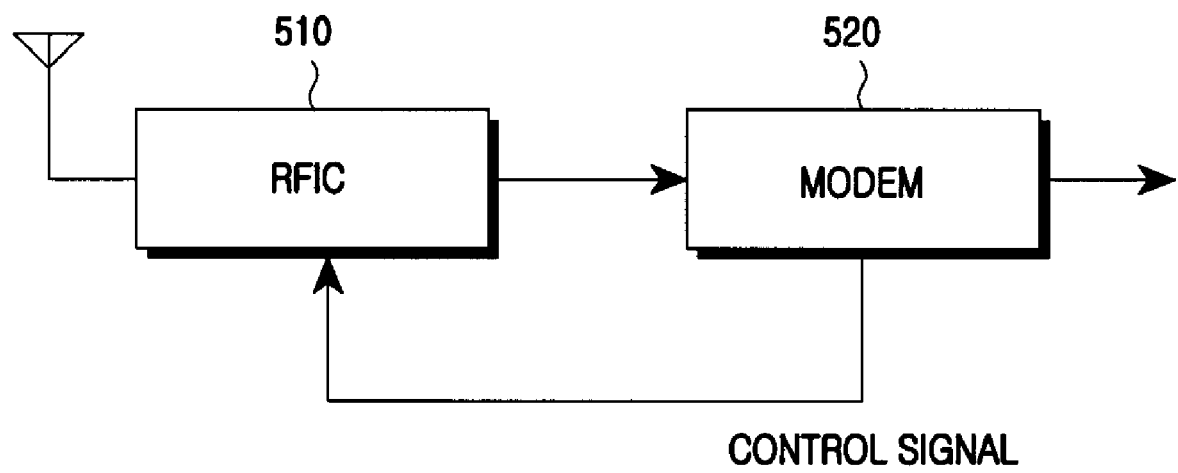
FIG. 5 is a block diagram illustrating a construction of a receiver according to an exemplary embodiment of the present invention.

FIG. 5 is a block diagram illustrating the construction of a receiver according to an exemplary embodiment of the present invention.

Referring to FIG. 5, if power is ON, an RF unit (i.e., an RFIC) 510 performs an initialization process and its own calibration process. The RF unit 510 applies a DC offset calibration value received from a modem 520, thus performing a calibration process under the control of the modem 520.

A fast AGC within the modem 520 determines a gain index for initial synchronization acquisition, provides and applies a set value for the determined gain index to the RF unit 510, and performs self calibration process in a transmission mode. The modem 520 measures a DC offset with no signal input to the RF unit 510 and determines if the DC offset value is more or less than a reference value (e.g., 5 mV). After that, if it is determined to be more than the reference value, the modem 520 provides its control signal to the RF unit 510, thereby performing inverse calibration according to the magnitude.

The modem 520 attempts the initial synchronization acquisition. If the initial synchronization acquisition succeeds, the modem 520 performs a DC offset trace and cancellation process after the initial synchronization acquisition.

The modem 520 initiates a process of measuring a magnitude of a DC offset in the DC offset trace and cancellation process after the initial synchronization acquisition. If sensing a frame interrupt that occurs at the time of frame reception, the modem 520 determines if the measured DC offset is more or less than a reference value (e.g., 5 mV). If it is determined to be more than the reference value, the modem 520 measures a current gain index value. The modem 520 traces and cancels the DC offset by storing a calibration value in a DC offset correction end of an RFIC depending on the gain index value during a transmission time (using a control signal).

An exemplary embodiment of the present invention has an advantage of preventing a initial synchronization failure of the receiver performing the initial synchronization at a signal level of a weak electric field under a condition that the receiver performed initial synchronization acquisition at a strong electric field and moved to the weak electric field and the weak electric field is enough to maintain synchronization.

The present invention enables a modem to directly measure and calibrate the magnitude of an input DC offset rather than allowing an RFIC to measure and calibrate its own DC offset, thereby capable of calibrating the DC offset value with more accuracy and thus guaranteeing an excellent performance during an initial synchronization acquisition. Also, the invention enables a modem to directly measure a DC offset and instruct calibration to an RFIC even during a normal operation, thereby enabling calibration with more accuracy; thus, increasing a CINR of a receiver and enhancing reception performance of the receiver. Further, upon initial synchronization acquisition and even after synchronization acquisition, the teachings of the invention allows effectively canceling a DC offset and obtaining an excellent performance of initial synchronization acquisition when there is an attempt to perform the initial synchronization acquisition at a weak electric field.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for canceling a Direct Current (DC) offset in a receiver having a modem and a Radio Frequency Integrated Circuit (RFIC) unit of a Broadband Wireless Access (BWA) communication system, the method comprising:
   canceling, by a modem, a DC offset by performing self-calibration;
   performing, by the modem, an initial synchronization acquisition;
   canceling, by the modem, the DC offset by performing a DC offset trace and cancellation process when the initial synchronization acquisition succeeds; and
   outputting by the modem a control signal to the RFIC unit comprising a calibration value of the DC offset that is stored in the RFIC unit for controlling calibrating a DC offset by the RFIC unit.

2. The method of claim 1, before the step of canceling, by a modem, a DC offset by performing self-calibration, further comprising:
   determining, by the modem, a gain index for the initial synchronization acquisition in a coarse frame synchronization step and applying the gain index to a Radio Frequency (RF) unit.

3. The method of claim 1, wherein the step of canceling, by a modem, a DC offset by performing self-calibration, comprises:
   measuring the DC offset, by the modem, with no signal input to a RF unit;
   determining whether the measured DC offset is more than a reference value; and
   performing an inverse calibration for the RF unit by a magnitude of difference between the measured DC offset and the reference value when the measured DC offset is more than the reference value.

4. The method of claim 1, wherein canceling, by the modem, the DC offset by performing a DC offset trace and cancellation process, comprises:
   determining whether a measured DC offset is more than a reference value, when the modem senses occurrence of a frame interrupt;
   measuring a current gain index value when the measured DC offset is more than the reference value; and
   performing an inverse calibration for an RF unit by storing a calibration value in a DC offset correction end of the RF unit depending on the current gain index value.

5. An apparatus for canceling a Direct Current (DC) offset in a receiver of a Broadband Wireless Access (BWA) communication system, the apparatus comprising:
   a modem comprising an Automatic Gain Controller (AGC) for setting a gain of a receiving end of an Radio Frequency Integrated Circuit (RFIC), said modem being configured for canceling a received DC offset by performing a self-calibration of the modem, performing an initial synchronization acquisition, and canceling the DC offset by performing a DC offset trace and cancellation process when the initial synchronization acquisition succeeds; and a receiver coupled to the modem, said receiver comprising the RFIC, said RFIC being configured for controlling reception/transmission switching and for performing an initialization process and a self-calibration of the RFIC under the control of the modem by receiving a control signal output from the modem including a DC offset value for self-calibrating the RFIC.

6. The apparatus of claim 5, wherein the RFIC includes means for determining a gain index for the initial synchronization acquisition in a coarse frame synchronization step and applying a set value for the gain index that is used by the modem.

7. The apparatus of claim 5, wherein the modem includes means for measuring the DC offset without a signal being input to the RFIC, and means for comparing whether the measured DC offset is greater than a reference value and controls an inverse calibration by the RFIC unit according to a magnitude of difference between the measured DC offset and the reference value, when the measured DC offset is greater than the reference value.

8. The apparatus of claim 5, wherein the modem determines whether a measured DC offset is more than a reference value when the modem senses occurrence of a frame interrupt, measures a current gain index value when the measured DC offset is more than the reference value and performs an inverse calibration for the RFIC by storing a calibration value in a DC offset correction end of an RF unit depending on the current gain index value.

* * * * *